United States Patent [19]
Leach et al.

[11] 3,975,510
[45] Aug. 17, 1976

[54] LOW-DENSITY, HIGH-POROSITY ALUMINA EXTRUDATES AND A METHOD FOR PRODUCING SAID EXTRUDATES

[75] Inventors: Bruce E. Leach, Ponca City, Okla.; George G. Hritz, Charlotte, N.C.; Dennis Jack Royer, Ponca City, Okla.

[73] Assignee: Continental Oil Company, Ponca City, Okla.

[22] Filed: Apr. 14, 1975

[21] Appl. No.: 567,564

Related U.S. Application Data

[63] Continuation-in-part of Ser. Nos. 268,246, July 3, 1972, abandoned, Ser. No. 168,420, Aug. 2, 1971, abandoned, and Ser. No. 191,091, Oct. 20, 1971, abandoned.

[52] U.S. Cl. ............................ 423/628; 423/630; 423/626
[51] Int. Cl.² .......................................... C01F 7/02
[58] Field of Search ............... 423/628, 630, 625; 264/176 R

[56] References Cited
UNITED STATES PATENTS

| | | | |
|---|---|---|---|
| 2,636,865 | 4/1953 | Kimberlin | 423/630 |
| 2,903,418 | 9/1959 | Kirshenbaum et al. | 423/630 |
| 3,403,111 | 9/1968 | Colgan et al. | 423/628 |
| 3,419,352 | 12/1968 | Acciarri | 423/630 |
| 3,743,709 | 7/1973 | Shaw et al. | 423/628 |
| 3,808,153 | 4/1974 | Shomitz et al. | 423/628 |
| 3,850,849 | 11/1974 | Kiovsky et al. | 423/628 |
| 3,853,789 | 12/1974 | Warthen et al. | 423/628 |

*Primary Examiner*—Herbert T. Carter
*Attorney, Agent, or Firm*—F. Lindsey Scott

[57] ABSTRACT

Low-density, high-porosity alumina extrudates and a method for preparing said extrudates. Said method comprises admixing finely divided low-density, high-porosity alumina with water to form an extrudable composition and extruding said mixture.

3 Claims, 3 Drawing Figures

LOW-DENSITY, HIGH-POROSITY ALUMINA EXTRUDATES AND A METHOD FOR PRODUCING SAID EXTRUDATES

REFERENCE TO RELATED APPLICATIONS

This application is a continuation-in-part of U.S. Ser. No. 268,246, entitled Low-Density, High-Porosity Alumina Extrudates and a Method for Producing Said Extrudates, filed July 3, 1972, by Bruce E. Leach, George G. Hritz, and Dennis J. Royer, U.S. Ser. No. 168,420 and U.S. Ser. No. 191,091, both entitled Low-Density, High-Porosity Alumina Extrudates and a Method for Producing said Extrudates and filed Aug. 2, 1971, and Oct. 20, 1971, respectively, by Bruce E. Leach, George G. Hritz, and Dennis J. Royer, all now abandoned.

BACKGROUND OF THE INVENTION

This invention relates to alumina extrudates. This invention further relates to low-density, high-porosity alumina extrudates. This invention further relates to a method for producing alumina extrudates. This invention further relates to a method for producing low-density, high-porosity alumina extrudates.

PRIOR ART

Alumina is produced by a variety of processes and is useful as a catalyst, catalyst supports, and the like. For many of these uses, extrudates are particularly desirable; therefore, numerous methods for extruding alumina have been proposed. None show a method for extruding a low-density, high-porosity alumina to produce an extrudate retaining substantially the properties of the starting low-density, high-porosity alumina. Most known methods are applicable to the extrusion of relatively high-density, low-porosity alumina. Such methods when applied to low-density, high-porosity alumina generally yield an extrudate having substantially higher density and lower porosity. Accordingly, much effort has been directed to the production of alumina extrudates wherein the desirable properties of the starting alumina material are retained in the finished extrudate.

OBJECTS OF THE INVENTION

It is an object of the present invention to provide a low-density, high-porosity alumina extrudate. A further objective of the present invention is a method for producing low-density, high-porosity alumina extrudates. A further objective of the present invention is a method for producing an alumina extrudate which exhibits a minimum of shrinkage upon drying after extrusion.

SUMMARY OF THE INVENTION

It has been found that alumina extrudates having desirable properties as follows:
  a. a diameter from about 1/32 to about ¼ inch,
  b. a packed bulk density from about 15 to about 35 pounds per cubic foot (lb/ft$^3$),
  c. a cumulative pore volume, 0–10,000 angstroms (A), from about 0.8 to about 2.0 cc per gram (cc/g), and
  d. a surface area from about 150 to about 350 square meters per gram (m$^2$/g) are obtained by extruding alumina, wherein said alumina has been produced by hydrolyzing aluminum alkoxides to produce an aqueous alumina portion and an organic portion, separating the aqueous alumina portion, admixing the aqueous alumina portion with an organic solvent, and thereafter drying; and wherein said alumina has the following properties:
  e. a bulk density from about 7.5 to about 25 lb/ft$^3$,
  f. a cumulative pore volume,* 0–10,000 A from about 1.0 to about 2.75 cc/g,
  g. a surface area from about 260 to about 400 m$^2$/g, and
  h. a Al$_2$O$_3$ content from about 77 to about 100 weight percent;

by the method of the present invention. Said method comprises admixing from about 40 to about 125 parts water with about 50 parts alumina. The water may contain acidic or alkaline components.

*All pore volumes are determined by the mercury penetration method.

DESCRIPTION OF THE PREFERRED EMBODIMENTS

Figure 1:
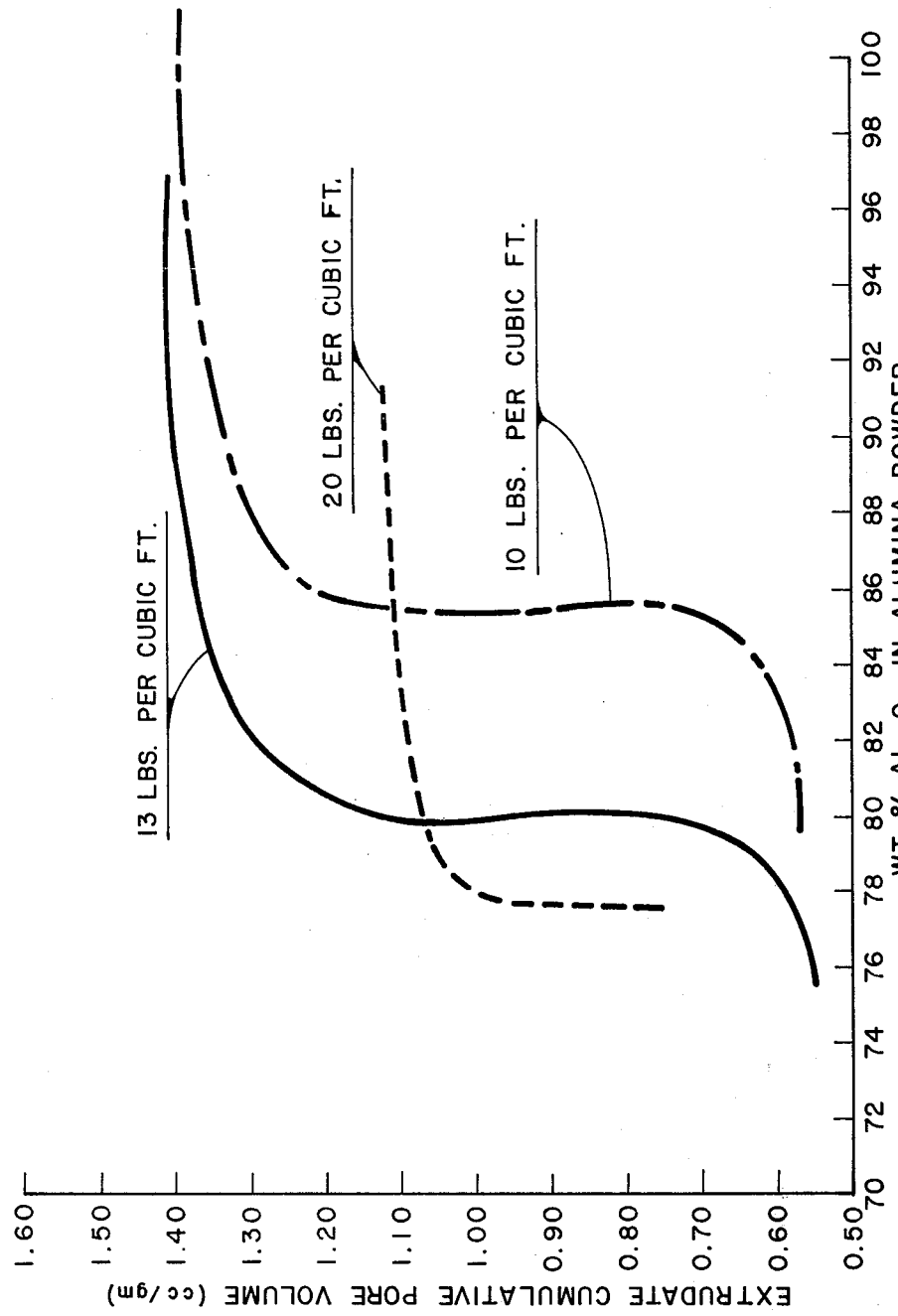
FIG. 1 is a graphic representation of the effects of varying Al$_2$O$_3$ contents upon the extrudate properties.

Alumina useful in the process of the present invention is alumina which has been produced by the water hydrolysis of aluminum alkoxides to produce an aqueous alumina portion and an organic portion. The aqueous alumina portion is then separated from the organic portion by means well known in the art, and the aqueous alumina portion is mixed with a solvent having a lower surface tension than water and dried. The alumina typically has a loose bulk density from about 7.5 to about 25 (lb/ft$^3$); a cumulative pore volume, 0–10,000 A; from about 1.0 to about 2.75 cc/g; and a surface area from about 260 to about 400 m$^2$/g. Suitable solvents for use in the process described above are ethanol, n-propanol, isopropanol, n-butanol, isobutanol, tertiary butanol, and the like. The process described above is more fully defined in U.S. Ser. No. 191,085, entitled "High-Porosity High-Surface Area, Low-Bulk Density Alumina," filed Oct. 20, 1971, now abandoned, by W. C. Ziegenhain; U.S. Pat. No. 3,773,691, entitled "Removal of Residual Carbon from Alumina," issued Dec. 20, 1973, by B. E. Leach; and U.S. Ser. No. 261,477, entitled "An Improved Calcining Method for Alumina," filed June 9, 1972, by W. C. Ziegenhain et al.

Alumina as used herein refers to an alumina product containing Al$_2$O$_3$, water of hydration, free water, and the like. Such alumina typically appears to be a dry solid material, and hereinafter the degree of drying will be shown by reference to the weight percent, Al$_2$O$_3$, in the alumina. The Al$_2$O$_3$ content is determined by drying the alumina at 900°F for 3 hours to produce 100 weight percent Al$_2$O$_3$.

Aqueous alumina portions suitable for use in the process to produce alumina suitable for extrusion by the method of the present invention are those containing up to about 32 weight percent alumina as Al$_2$O$_3$ wherein said alumina has not previously been dried subsequent to its production from the raw materials used, i.e., aluminum alkoxides, alum, alkali metal aluminates, and the like. Some dispersible aluminas where redispersed and treated by the process show improvements in desirable proerties but are not substantially improved by comparison to comparable alumina which has not been previously dried. It has been found that aqueous alumina slurries can be concentrated by drying and the like to about 32 weight percent $Al_2O_3$ prior to treatment by the process without substantial loss in the desirable product parameters. Above about 32 weight percent $Al_2O_3$, losses in product quality were apparent. Preferred slurry compositions are from about 10 to about 20 weight percent $Al_2O_3$.

Slurry as used herein refers to alumina mixtures with water, etc, in widely varying amounts. The mixtures containing small amounts of alumina are very fluid whereas the mixtures containing higher amounts of alumina may appear as a semi-solid material. Slurry is used to describe all such mixtures within the stated composition ranges.

In a preferred embodiment of the present invention an alumina slurry as described above is filtered to produce a filtercake containing about 16 weight percent $Al_2O_3$ and thereafter mixed with an effective amount of a suitable solvent. The solvent-aqueous alumina mixture is then dried to produce a high-porosity, high-surface area, low-bulk density alumina. The mixing may be performed by various methods, i.e., the aqueous alumina slurry may be mixed with an effective amount of a suitable solvent and dried, the aqueous alumina slurry may be filtered, mixed with an effective amount of a suitable solvent, and dried; successive solvent contacts and filtrations may be used prior to drying and the like.

Figure 2:
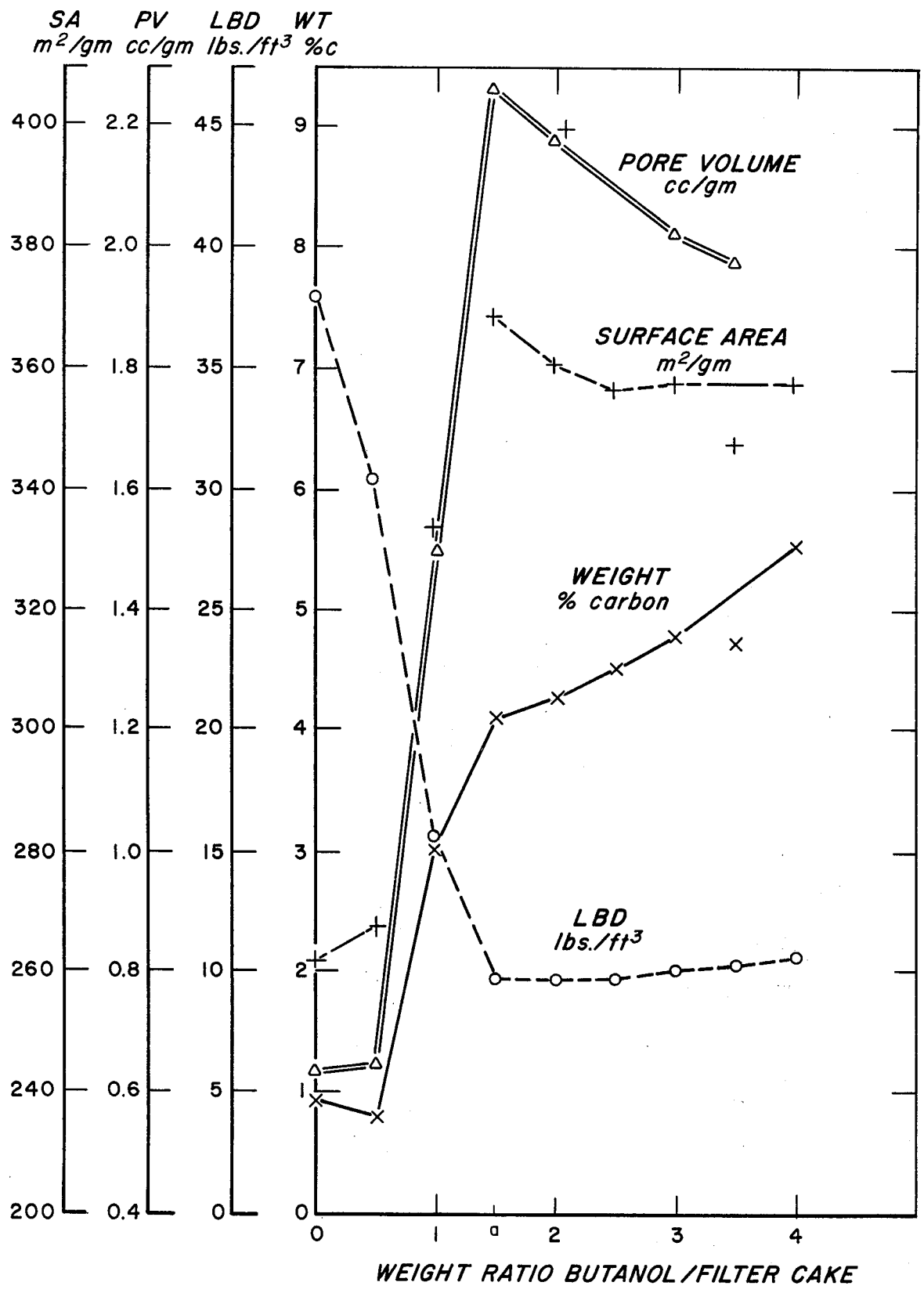
FIG. 2 is a graph showing the variation in alumina properties as a function of the amount of solvent mixed with an aqueous alumina filtercake prior to drying.

In FIG. 2 varying amounts of n-butanol were mixed with an aqueous alumina filtercake containing about 15 weight percent $Al_2O_3$ to form n-butanol—aqueous alumina slurries of varying n-butanol content. The slurries were then dried and the properties of the alumina produced were determined. The most desirable alumina properties were obtained near the point (a) at which the amount of n-butanol added was sufficient to azeotropically remove the water from the aqueous alumina filtercake. Desirable alumina was produced when the amount of n-butanol added was an amount equal to at least 25 percent of the amount of n-butanol required to azeotropically remove the water present.

The method of contacting is effective when at least enough solvent is added to form a mixture of the solvent and the water present in the aqueous alumina portion so that the solvent is present in an amount equal to at least 25 percent of the solvent required to azeotropically remove the water upon drying. Lesser amounts of solvent may be used to achieve lesser improvement in alumina properties, but it has been observed that more desirable results are obtained when at least 25 percent and preferably at least 50 percent of the azeotropic amount is used. It has been found that desirable results are obtained when up to about 150 percent excess solvent is used. References to proportions of solvent to water, solvent to alumina filtercake, etc, as used herein are by weight unless otherwise stated.

For purposes of calculating the water present, the alumina is treated as $Al_2O_3$; thus, the water of hydration is treated as removable water even though such water is not usually removed in the early drying operations, i.e., usually an alumina hydrate such as alpha alumina monohydrate is the product from the first drying step although such alumina may be further dried or calcined to unhydrated alumina such as gamma alumina and the like. In the methods listed above, it is necessary to have the solvent-aqueous alumina mixture described above only in the mixture immediately prior to drying, i.e., prior washes or contacting can be at any desired ratio.

Suitable solvents are ethanol, propanol, isopropanol, butanol, isobutanol, and tertiary butanol. Other solvents such as methanol and acetone were tested but found to be less desirable in achieving the desired reductions in bulk density and increases in porosity and surface area. The listed solvents all yield desirable products, but based primarily on economics and availability, the ethanol and butanol are preferred, and of the two, butanol is preferred over ethanol since it is present in many processes where the methods of the present invention are useful.

Azeotropic mixtures of the suitable solvents are as follows:

| Solvent* | Wt. % Solvent | Wt. % Water | B.P. °C |
|---|---|---|---|
| Ethanol | 95.5 | 4.5 | 78.1 |
| Propanol | 71.7 | 28.3 | 87.7 |
| Isopropanol | 87.9 | 12.1 | 80.4 |
| n-Butanol | 62 | 38 | 92.4 |
| Isobutanol | 66.8 | 33.2 | 90.0 |
| Tertiary Butanol | 88.3 | 11.7 | 79.9 |

*Langes Handbook of Chemistry, Ninth Edition, pages 1484–1485.

It has been found that with butanol very desirable results are obtained when a 1.5:1.0 weight ratio of butanol to alumina filtercake containing about 10 to 20 weight percent of $Al_2O_3$ is used in the final drying step. Other solvents listed are not optimized, but by use of the azeotropic mixtures, those skilled in the art will find no difficulty in selecting appropriate solvent-water ratios.

The use of greater amounts of solvent does not defeat the objectives of the process, but it has been observed with all solvents listed that upon increasing the solvent-water ratio substantially, greater amount of residual organic material, hereinafter referred to as residual carbon, remain on the alumina product. With butanol it has been observed that slight losses in surface area and porosity as well as slight increases in loose bulk density are observed when butanol-alumina slurry ratios greater than about 2.0:1 are used. Such higher ratios also result in substantial residual carbon increases. Thus the use of greater solvent ratios appears detrimental in some respects with no offsetting advantages.

Desirably the solvent is present in an amount equal to from about 25 to about 250 percent of that amount of solvent required to azeotropically remove all the water present in the solvent-aqueous alumina mixture upon drying. Preferably the solvent is present in an amount equal to from 50 to about 150 percent of the solvent required to azeotropically remove the water from the solvent-aqueous alumina mixture upon drying.

It should be noted that the solvent added need not be anhydrous but may contain water so long as the added material plus the water in the alumina slurry result in a suitable mixture.

The alumina produced by the process has desirable properties for use as catalytic materials and the like, such as a loose bulk density from about 7.5 to about 25.0 $lb/ft^3$, a surface area from about 260 to about 400 $m^2/g$, and a pore volume from about 1.0 to about 2.75 cc/g. Preferred properties are a loose bulk density from about 9 to about 15 lbs/ft$^3$, a pore volume from about 1.5 to about 2.75 cc/g, and a surface area from about 300 to about 400 m$^2$/g. Such alumina is very desirable for catalytic uses. A further desirable property is that a high proportion, typically more than 50 percent of the pore volume, consists of pores smaller than 1000 A in diameter with a typical average pore diameter from about 80 to about 150 A.

A preferred method for the production of such alumina comprises:

a. reacting alumina alkoxides having alkoxy groups containing from about 1 to about 30 carbon atoms in the alkoxide portion with an aqueous solution to produce an aqueous alumina slurry and an organic portion;

b. separating the organic portion and the aqueous alumina slurry;

c. optionally further purifying the aqueous alumina slurry by solvent extraction, stream stripping, and the like to further remove any remaining minor portions of the organic portion; and d. mixing the aqueous alumina slurry with an effective amount of an organic solvent as discussed heretofore and as shown in FIG. 2.

Figure 3:
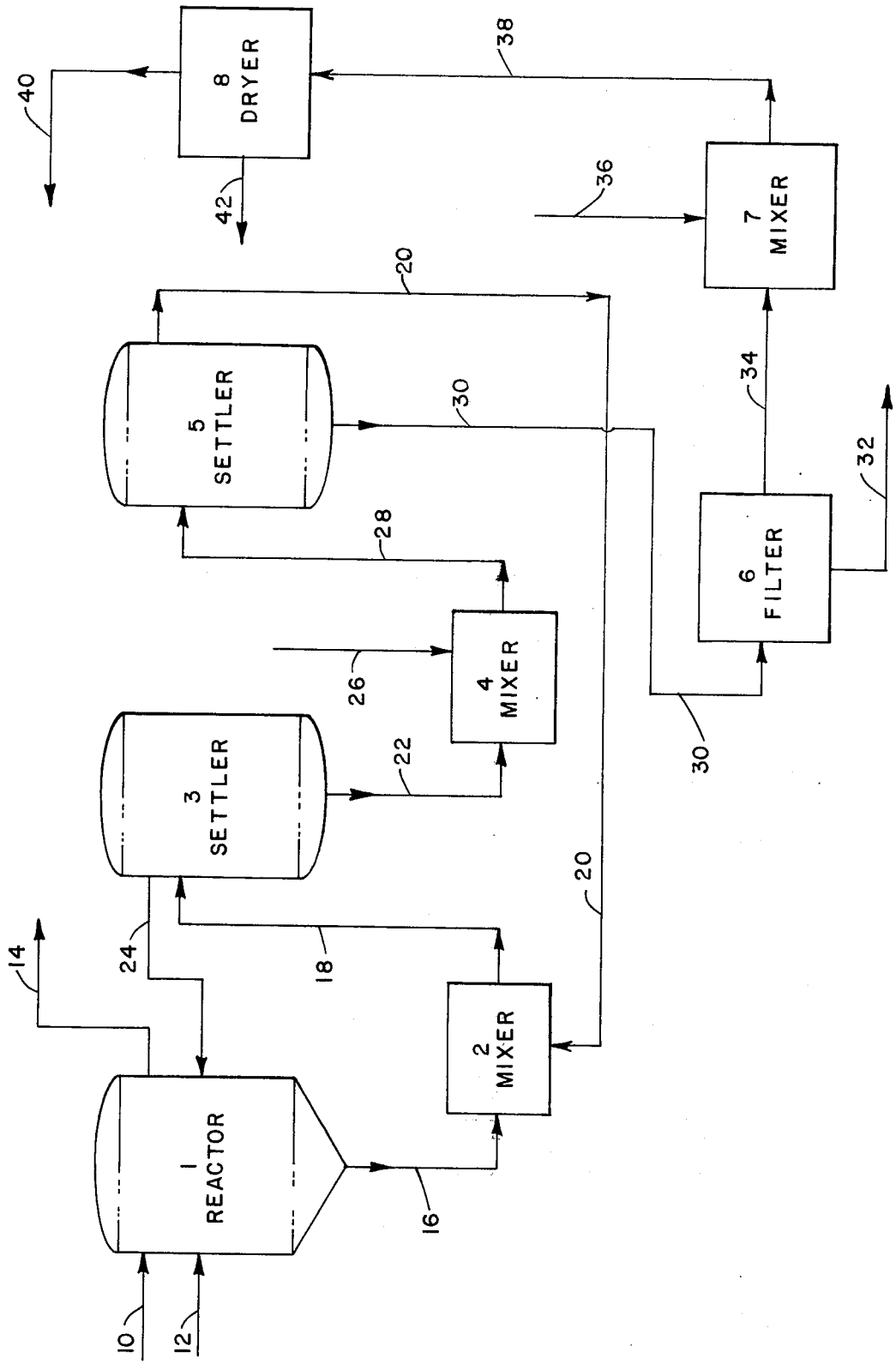
FIG. 3 is a flow diagram showing a process for the production of alumina by the water hydrolysis of aluminum alkoxides.

In a typical embodiment shown in FIG. 3, a mixture of aluminum alkoxides with alkoxy groups containing from about 1 to about 30 carbon atoms is charged to reactor 1 through line 10. Water containing streams are charged to reactor 1 through lines 12 and 24. The aqueous streams 12 and 24 contain substantial amounts of organic material such as butanol. The reaction products, organic alkoxide material such as alcohols and alumina in an aqueous slurry, are withdrawn through lines 14 and 16, respectively. The alumina slurry contains alumina, water, alcohols, and unreacted aluminum alkoxide material. The alumina slurry in line 16 is mixed with the overhead stream from settler 5 which is passed from settler 5 to mixer 2 through line 20. The overhead stream is primarily butanol saturated with water. The mixed aqueous alumina slurry and butanol are passed from mixer 2 to settler 3 through line 18 and allowed to separate into an aqueous alumina slurry and a water saturated butanol layer. The butanol layer is passed to reactor 1 through line 24 and the alumina slurry is withdrawn through line 22 and passed to mixer 4 where the alumina slurry is mixed with a butanol stream 26 which contains water up to a fully water saturated butanol water phase. The mixed aqueous alumina and butanol are passed to settler 5 through line 28 where a separation to a water saturated butanol phase and an aqueous alumina phase is effected. The aqueous alumina slurry is withdrawn through line 30 and the butanol phase is passed through line 20 to mixer 2. The aqueous alumina slurry in line 30 is substantially free of alkoxide material and alcohols heavier than butanol and is passed to filter 6 where an alumina filtercake containing typically about 16 weight percent Al$_2$O$_3$ is separated and passed through line 34 to a mixer 7. The water separated is discarded by way of line 32 or recycled as desired. In mixer 7 the aqueous alumina filtercake is mixed with a solvent, typically butanol, in an amount at least sufficient to form a butanol-water mixture with the water present in the alumina filtercake. The mixture from mixer 7 is passed through line 38 to dryer 8 where the alumina mixture is dried. The butanol-water vapor is recovered from line 40 and recycled or separated into its component parts and dry alumina is recovered through line 42.

It is pointed out that FIG. 3 is merely a typical embodiment and is not limiting except as stated. In particular the solutions added to mixers 2 and 4 by lines 20 and 26 may be water, water containing dissolved light alcohols containing from 1 to about 6 carbon atoms, alcohols containing from 1 to about 6 carbon atoms containing dissolved water, and the like. The aqueous alumina purification steps in mixers 2 and 4 and settlers 3 and 5 may be replaced by other purification steps such as treatment of the aqueous alumina slurry with other organic solvents, steam stripping, and the like. In some instances the purification may be omitted entirely although it is likely that alumina so produced will contain high carbon residues. In general the process may be modified in a variety of ways known to those skilled in the art within the contemplation of the present invention. What is preferred is the alumina slurry resulting from the water hydrolysis of aluminum alkoxides.

In the process for producing such alumina by the hydrolysis of aluminum alkoxides, the same solvents are used in the solvent contacting procedure as listed above; however, butanol and ethanol are greatly preferred since they are readily available in most such processes.

It has now been found that alumina such as described above can be extruded to produce desirable extrudates retaining substantially the desirable properties of the starting alumina by admixing about 50 parts alumina with from about 40 to about 125 parts water. Very desirable results have been obtained when a water volume approximately equal to the pore volume of the alumina to be extruded is used; i.e., for 50 grams of alumina having a pore volume of about 1.25 cc/g, very desirable extrudates are obtained when about 62.5 grams of water are added. Further, it is necessary to adjust the Al$_2$O$_3$ content of the alumina starting material based on the density of the alumina starting material. For instance, in FIG. 1, it will be observed that with denser alumina starting materials, lower Al$_2$O$_3$ contents are permissible. It will be observed that with low-density alumina materials, i.e., 10 lb/ft$^3$ or less, the starting material properties are lost to a large degree when extrusion is carried out at Al$_2$O$_3$ contents below about 83 weight percent. It is further pointed out that when such light alumina starting materials are used, the extrusion may be conducted at Al$_2$O$_3$ contents as high as 100 weight percent Al$_2$O$_3$. It will be noted further that with heavier alumina starting materials, lower Al$_2$O$_3$ concentrations may be used in the starting material while still producing an extrudate having substantially the desirable properties of the starting material. For instance, it will be observed in the 20 lb/ft$^3$ alumina starting material that with as low as 77 weight percent Al$_2$O$_3$, very desirable properties are retained. It will further be observed that with such materials, the extrusion process of the present invention is not operable above an Al$_2$O$_3$ content of about 90 weight percent. Starting materials having densities greater than about 10 lb/ft$^3$ and lighter than about 35 lb/ft$^3$ will vary in a similar manner. The determination of the most desirable Al$_2$O$_3$ concentration in the starting material is well within the ability of those skilled in the art and need not be discussed further. It is noteworthy that for each particular alumina density, there is a minimum Al$_2$O$_3$ concentration below which properties are lost to a high degree if the extrusion process is carried on at such lower Al$_2$O$_3$ content and that the transition zone between conditions which result in the retention of desirable properties and those conditions which result in loss of the desirable properties is quite pronounced as shown in the figure. It is pointed out that as the $Al_2O_3$ density increases beyond 35 lb/ft$^3$, the improvement achieved by proper adjustment of the $Al_2O_3$ content is less pronounced and the alumina does not extrude at high $Al_2O_3$ concentrations; i.e., with alpha alumina monohydrate which has a loose bulk density of about 45 lb/ft$^3$, the method of the present invention is ineffective above $Al_2O_3$ contents of about 82 weight percent and no transition zone has been observed.

The process of the present invention may be carried out satisfactorily, wherein water and alumina are mixed as described above; however, it has been observed that the strength of the extrudates produced may be improved when small amounts of acid are admixed with the water prior to the formation of the extrudable alumina mixture. Very desirable results have been obtained when up to about 2.0 weight percent acid was used. Suitable acids are those selected from the group consisting of inorganic acids, mono-functional aliphatic carboxylic acids containing from about 1 to about 3 carbon atoms and halogenated mono-functional aliphatic carboxylic acids contained from about 2 to about 3 carbon atoms. Some examples of such acids are hydrochloric acid, sulfuric acid, nitric acid, acetic acid, formic acid, propionic acid, monochloroacetic acid, dichloroacetic acid, trichloroacetic acid, and the like. Very desirable results have been obtained wherein the acid was added in an amount equal to about 0.3 weight percent acid based on the dry alumina weight. As noted above, slightly better extrudate crush strengths are obtained wherein the acid is used. The same properties discussed above and shown in FIG. 1 are observed with both the acidified water and water alone. In the method described above, the acid, water, and alumina may be mixed in any desired sequence; however, it is preferred that from about 25 to 58 parts water and the acid be admixed and thereafter the acid-water mixture admixed with the alumina to form a mixture of uniform consistency. The remaining water is then added to form a composition of uniform consistency containing up to about 2.0 parts acid, from about 40 to about 125 parts water, and about 50 parts alumina. The addition of the acid directly to the dry alumina is the least preferred sequence of addition, since portions of the alumina may be overpeptized by contacting the concentrated acid unless very uniform acid dispersion is achieved immediately.

In a preferred embodiment of the present invention, a low density, high-porosity alumina is dried to an $Al_2O_3$ content suitable for extrusion by the present method in light of the density of the starting alumina material. The alumina is then admixed with water containing up to about 2.0 parts acid and mixed or mulled to form a composition of uniform consistency. The resulting mixture is a putty-like composition which extrudes well and exhibits little shrinkage upon drying. The extrudates produced by such a method retain many of the desirable properties present in the starting material. By contrast, when such alumina is extruded by other methods for extrusion which require higher acid levels, etc, and which allow extrusion outside the proper $Al_2O_3$ ranges, many of these desirable properties, such as the low density and high porosity, are lost.

It has further been found that certain alkaline materials may be added to the water prior to mixing with the alumina for extrusion by the method of the present invention. Such alkaline materials may be added in an amount up to about 5.0 weight percent based on the dry weight of the alumina starting material. Any suitable alkaline material may be used, but preferred alkaline materials are selected from the group consisting of ammonia, ammonium carbonate, and ammonium bicarbonate. The listed materials are preferred in many applications since a primary criteria in alumina for many uses is that the alumina contain no contaminating anions or cations, and it will be observed that the listed materials are readily vaporized and removed from the alumina extrudate upon drying. In the event that anionic or cationic materials are desirable in the product alumina extrudate, then the alkaline materials may be selected from alkaline materials containing the desired material. The technique and procedures for extruding using the alkaline materials are similar to those involved wherein the acid is added. Many of the same advantages are realized in that the extrudates are stronger, and in certain instances extrusion is more readily achieved.

Certain advantages are achieved by each of the three approaches; i.e., use of water alone, use of acidified water, or the use of alkaline water. The use of water alone is simpler, involves the addition of no extraneous materials, and results in a relatively neutral alumina extrudate. The use of acidified water has the advantage that stronger extrudates are produced, the alumina has a slightly acidic surface, and is more useful in certain catalytic applications. The alkaline extrusion route has the advantage that the extrudates are somewhat stronger than produced by the use of water alone, and in certain applications wherein a less acidic alumina is desired, such extrudates are preferred.

It is believed that the method of the present invention is applicable primarily if not solely to alumina produced by the process described. In particular, it has been observed with alumina produced by the alum process that after solvent treatment and drying as described above, such alumina had desirable properties but that such properties were lost to a substantial extent upon extrusion, and extrusion was difficult under most conditions applicable to the preferred alumina. No fully satisfactory explanation is presently available for this difference.

The extrudates produced by the means of the present invention retain substantially the properties of the starting materials. Alumina extrudates having the following properties have being prepared by the method of the present invention:

a. a diameter from about 1/32 to about ¼ inch,
b. a packed bulk density of about 15 to about 35 lb/ft$^3$,
c. a cumulative pore volume from about 0.8 to about 2.00 cc per gram, 0–10,000 A, pore diameter, and
d. a surface area from about 150 to about 350 m$^2$/g.

Desirable extrudates have been obtained by using as a starting material alumina produced by the process described hereinbefore and having the following properties:

e. a loose bulk density from about 8 to about 35 lb/ft$^3$,
f. a surface area from about 250 to about 500 m$^2$/g,
g. a pore volume from about 0.8 to about 2.5 cc/g, and
h. an $Al_2O_3$ content from about 77 to about 100 weight percent.

Desirable extrudates have been obtained by the use of water, acidified water, and alkaline water solutions. The extrudates typically are dried at 250°F for 6 hours and then calcined at 900°–1000°F for 3 hours to produce a finished extrudate. Minimal shrinkage of the extrudates during drying has been observed.

A significant process modification whereby alumina not otherwise suitable for extrusion by the process of the present invention may be used in the production of desirable extrudates consists of admixing such unsuitable alumina with the suitable alumina and producing desirable extrudates by the method of the present invention using the mixture as a starting material. The proportions of suitable and unsuitable alumina may be varied widely dependent upon the properties of the materials. Such variations are obvious to those skilled in the art and need not be discussed further.

Other variations and process modifications are possible within the spirot of the present disclosure, and indeed, such modifications as well as other uses for the extrudate materials may appear obvious to those skilled in the art upon review of this specification and the appended claims and examples.

alumina over a three-minute period. After an additional ten-minute mixing period an additional 1360 grams of water was admixed slowly during a 20-minute period. The alumina mixture comprising 40 parts acetic acid, 3320 parts water, and 2000 parts alumina was extruded through a ⅛-inch orifice, dried at 250°F for 6 hours, and calcined at 1000°F for 3 hours. The extrudate so produced had a loose bulk density of 22.8 lb/ft$^3$, a surface area of 282 m$^2$/g, and a cumulative pore volume of 1.35 cc/g.

EXAMPLE 2

Further tests were performed using a similar procedure and using as a starting material an alpha alumina monohydrate derived from the water hydrolysis of aluminum alkoxides and having the following properties:
 a. a loose bulk density of 11 lb/ft$^3$,
 b. a surface area of 350 m$^2$/g,
 c. a cumulative pore volume of 1.9 cc/g, and
 d. an alumina content after drying as shown in the column headed Al$_2$O$_2$ content, weight percent. The results of the tests performed are shown below in Table I.

TABLE I

| Test No. | Alumina g | Al$_2$O$_3$ Content Wt % | Drying Conditions | ACID Type | ACID Amount, g | Water g | EXTRUDATE PORE VOLUME cc/g | EXTRUDATE PORE VOLUME cc/g(2) | Surface Area m$^2$/g | PBD(3) lb/ft$^3$ | Shrinkage (4) % |
|---|---|---|---|---|---|---|---|---|---|---|---|
| 1 | 25 | 80 | 200°F 6 hrs | formic | 0.5 | 35 | 0.57 | | | | 31 |
| 2 | 454 | 80 | 200°F 6 hrs | formic | 9.0 | 690 | | | | 44.9 | 23 |
| 3 | 50 | 82.6 | 500°F 16 min | acetic | 0.5 | 75 | | 0.59 | 278 | 34.2 | 21 |
| 4 | 50 | 84.6 | 500°F 23 min | acetic | 0.5 | 75 | | 0.65 | 273 | 31.3 | 15 |
| 5 | 37 | 86.2 | 500°F 2 hrs | acetic | 0.5 | 60 | 1.47 | 1.42 | 296 | | 3 |
| 6 | 50 | 87.6 | 500°F 2 hrs | acetic | 0.5 | 75 | | 1.18 | | 20.7 | 3 |
| 7 | 25 | 95.0 | 700°F 6 hrs | acetic | 0.5 | 39.5 | 1.41 | | 319 | 24.5 | 3 |
| 8 | 25 | 95.0 | 700°F 6 hrs | nitric(1) | 0.5 | 44.5 | | 1.32 | 318 | 24.6 | 3 |
| 9 | 25 | 100.0 | 900°F 3 hrs | acetic | 0.5 | 48.5 | 1.26 | 1.32 | 298 | 19.6 | 0 |

(1) Added as 70 weight percent nitric acid in aqueous solution.
(2) Pore volume determined by water pickup.
(3) Packed bulk density.
(4) Shrinkage = $\frac{(\text{wet extrudate diameters} - \text{dried diameter})}{\text{wet extrudate diameter}} \times 100$
(5) Cumulative pore volume of pores 0–10,000 Å in diameter.

EXAMPLES

The pore volumes shown in the following examples were determined by the mercury penetration technique using pressures up to about 50,000 psig. The tests were performed on a Mercury Porisimeter, Model 905-1, manufactured by the Micromeritics Corporation of Norcross, Georgia.

EXAMPLE 1

Alpha alumina monohydrate, derived from the water hydrolysis of aluminum alkoxides produced by the Ziegler process, containing from about 2 to about 26 carbon atoms in each alkoxide group and having a loose bulk density of 12.8 lb/ft$^3$, a surface area of 355 m$^2$/g, an Al$_2$O$_3$ content of 73 weight percent, and a cumulative pore volume, 0–10,000 Å, of 1.79 cc/g was dried at 700°F for 6 hours. After calcining the Al$_2$O$_3$ content was 95 weight percent. The 2000 grams of alumina remaining after calcining was then placed in a mixmuller and a mixture containing 40 grams of acetic acid and 1960 grams of water was admixed with said Tests 1, 2, 3, and 4 show extrudates prepared using alpha alumina monohydrate containing less than 85 weight percent Al$_2$O$_3$. It will be noted that by comparison to the properties of the starting alumina, the bulk density has increased from about 11 lb/ft$^3$ to about 34 to 45 lb/ft$^3$, the pore volume has been reduced from about 1.9 cc/g to about 0.60 cc/g, and the shrinkage on the extrudates is high, i.e., 15 to 31 percent.

By contrast tests 5 through 9 show that significant improvement in the properties retained in the extrudate is achieved when the Al$_2$O$_3$ content in the alumina extruded is adjusted to a value greater than 85 weight percent. A similar comparison to that above shows that the initial bulk density has been increased from about 11 lb/ft$^3$ to about 20 to about 25 lb/ft$^3$, the pore volume has been reduced from about 1.9 cc/g to about 1.2 to about 1.4 cc/g, and shrinkage has been reduced to less than 3 percent. The transition zone for the alumina sample is thus shown to be about 85 weight percent Al$_2$O$_3$.

EXAMPLE 3

Alumina was prepared by dissolving 400 grams of alum [$Al_2(SO_4)_3$] in 2 liters to water, neutralizing to a pH of 5 with ammonia, recovering the precipitated alumina by filtration, and washing the precipitated alumina with water. The alumina was divided into two portions. The first portion was dried to 73 weight percent $Al_2O_3$. The second portion was washed with isopropanol, filtered, and dried to 76.5 weight percent alumina. The second portion of dried alumina had a loose bulk density of 13 lb/ft$^3$.

Attempts to obtain extrudable mixtures by the process of the present invention were unsuccessful, i.e., attempts to prepare extrudable mixtures at $Al_2O_3$ contents below 85 weight percent required excessive amounts of acid, and even by the addition of excess acid, extrudable compositions could not be obtained at $Al_2O_3$ contents greater than 85 weight percent. Both portions showed similar characteristics in that neither yielded an extrudable mixture by the method of the present invention when the $Al_2O_3$ content was greater than 85 weight percent.

EXAMPLE 4

An alumina prepared from sodium aluminate was evaluated. At 71.5 weight percent $Al_2O_3$ suitable extrudate could be prepared, at 76.8 weight percent less desirable extrudates were obtained, above 82.95 weight percent very undesirable extrudates were obtained, i.e., the extrudates were of a grainy character and the paste was very crumbly, and above 83 weight percent the material would not bind together to form an extrudable paste.

Thus it is shown that the alkoxide produced material uniquely forms desirable extrudates by the method of the present invention whereas other aluminas do not.

EXAMPLE 5

An aqueous alumina slurry produced by the water hydrolysis of aluminum alkoxides produced by the Ziegler process was contacted with butanol and dried. The alumina product had a loose bulk density of about 11 lb/ft$^3$, a surface area of about 285 m$^2$/g, and a pore volume of about 1.99 cc/g.

Alumina extrudates were produced by mixing the alumina with water to form a composition of uniform consistency and extruding. The extrudates were dried at 250°F for 2 hours. The extrudate properties, quantities of water and alumina, and the like are shown below.

TABLE II

| | |
|---|---|
| Alumina (g) | 500 |
| Water (g) | 980 |
| $Al_2O_3$ Content wt % | 90.4 |
| Extrudate Properties | |
| Surface Area m$^2$/g | 268 |
| Cumulative Pore Volume | |
| 0–10,000 A | 1.16 |
| Cumulative Pore Volume Distribution | |
| 0–35 A | 0.06 |
| 0–40 A | 0.11 |
| 0–50 A | 0.12 |
| 0–65 A | 0.24 |
| 0–80 A | 0.51 |
| 0–100 A | 0.71 |
| 0–120 A | 0.77 |
| 0–150 A | 0.80 |
| 0–200 A | 0.85 |
| 0–250 A | 0.87 |
| 0–350 A | 0.89 |
| 0–500 A | 0.89 |
| 0–800 A | 0.92 |
| 0–1000 A | 0.93 |
| 0–2000 A | 0.98 |
| 0–5000 A | 1.06 |
| 0–10,000 A | 1.16 |

It is seen that many of the desirable properties present in the alumina powder are obtained in the extrudate, i.e., the surface area is high (268 m$^2$/g), the pore volume is high (1.16 cc/g), and the bulk density is low. Generally for very high pore volume starting materials a higher portion of the pore volume is lost than with lower pore volume materials, but desirable extrudates, i.e., pore volumes of 1.0 cc/g and greater, are obtained.

EXAMPLE 6

An aqueous alumina slurry produced by the water hydrolysis of aluminum alkoxides produced by the Ziegler process was contacted with butanol and dried. The alumina product had a loose bulk density of 12.19 lb/ft$^3$, a surface area of 312 m$^2$/g, and a pore volume of 1.81 cc/g.

Alumina extrudates were prepared by mixing the alumina with an aqueous ammonia solution and water to form a composition of uniform consistency and extruding the composition so prepared. The extrudates were dried at 250°F for 2 hours. The extrudate properties, quantities of water and ammonia, and the like are shown below.

TABLE III

| | | |
|---|---|---|
| Alumina (g) | 500 | 500 |
| 2% Aqueous Ammonia (ml) | 500 | |
| 6% Aqueous Ammonia (ml) | | 500 |
| Water (ml) | 360 | 510 |
| $Al_2O_3$ Content (wt %) | 94.6 | 91.0 |
| Extrudate Properties | | |
| Surface area m$^2$/g | 226 | 262 |
| Cumulative Pore Volume | | |
| 0–10,000 A (cc/g) | 1.02 | 1.18 |
| Cumulative Pore Volume Distributions | | |
| 0–35 A | 0.01 | — |
| 0–40 A | 0.11 | — |
| 0–50 A | 0.12 | 0.01 |
| 0–65 A | 0.17 | 0.11 |
| 0–80 A | 0.34 | 0.36 |
| 0–100 A | 0.66 | 0.55 |
| 0–120 A | 0.72 | 0.64 |
| 0–150 A | 0.77 | 0.70 |
| 0–200 A | 0.80 | 0.77 |
| 0–250 A | 0.82 | 0.80 |
| 0–350 A | 0.84 | 0.84 |
| 0–500 A | 0.84 | 0.87 |
| 0–800 A | 0.86 | 0.89 |
| 0–1000 A | 0.87 | 0.90 |
| 0–2000 A | 0.89 | 0.94 |
| 0–5000 A | 0.95 | 0.98 |
| 0–10,000 A | 1.02 | 1.18 |

It will be noted that no loose bulk densities are reported for the extrudates. The loose bulk density is generally considered of less significance than the surface area and pore volume and is not analyzed in all samples; however, the range of loose bulk densities typically produced from materials such as those used in the tests varies from 20–24 lb/ft$^3$.

EXAMPLE 7

An aqueous alumina slurry produced by water hydrolysis of aluminum alkoxides produced by the Ziegler process was contacted with butanol and dried. The alumina product had a loose bulk density of 19.9 lb/ft$^3$, a surface area of 277 m²/g, and a pore volume of 1.20 cc/g.

An extrudable alumina mixture was prepared by mixing 20 grams of alumina, having an $Al_2O_3$ content of 82.4 weight percent, 20 ml of a solution of 0.6 volume percent acetic acid in water, and an additional 1.4 ml of distilled water. The alumina mixture when extruded and dried produced extrudates having a pore volume of 1.07 cc/g.

It is seen that a higher proportion of the alumina powder pore volume is retained after extrusion using this higher density alumina than that shown in the other examples for lower density alumina powder. In addition, the 20 lb/ft³ powder is shown to be extrudable at an alumina content less than 85 weight percent while still retaining a high percentage of the powder porosity.

Having thus described the invention we claim:

1. A method for preparing alumina extrudates having a loose bulk density from about 15 to about 35 lb/ft³, a cumulative pore volume, 0–10,000 A, from about 0.8 to about 2.0 cc/g, and a surface area of about 150 to about 350 m²/g consisting essentially of sequentially admixing 50 parts alumina having the properties: a loose bulk density from about 7.5 to about 25 lb/ft³, a cumulative pore volume, 0–10,000 A, from about 1.0 to about 2.75 cc/g, a surface area from about 260 to about 400 m²/g, and an $Al_2O_3$ content from about 77 to about 100 weight percent $Al_2O_3$ with from about 40 to about 125 parts water to form an extrudable putty-like alumina-water mixture and extruding said mixture wherein said alumina is produced by:

a. hydrolyzing aluminum alkoxides to produce an aqueous alumina portion containing up to about 32 weight percent $Al_2O_3$ and an organic portion;

b. separating said aqueous alumina portion from said organic portion;

c. admixing said aqueous alumina portion with an organic solvent selected from the group consisting of ethanol, n-propanol, isopropanol, n-butanol, isobutanol, tertiary butanol, and mixtures thereof to form a solvent-aqueous alumina mixture containing an amount of said solvent equal to at least 25 percent of the amount of said solvent required to azeotropically remove the water from said mixture;

d. drying said solvent-aqueous alumina mixture to produce alumina having a loose bulk density from about 7.5 to about 25 lb/ft³, a cumulative pore volume, 0–10,000 A, from about 1.0 to about 2.75 cc/g, a surface area from about 260 to about 400 m²/g, and an $Al_2O_3$ content from about 77 to about 100 weight percent $Al_2O_3$.

2. The method of claim 1 wherein said alumina has a loose bulk density from about 8 to about 15 lb/ft³ and an $Al_2O_3$ content from about 85 to about 95 weight percent and wherein said 50 parts of alumina is admixed with from about 70 to about 125 parts water.

3. The method of claim 1 wherein said alumina has a loose bulk density from about 15 to about 25 lb/ft³ and an $Al_2O_3$ content from about 77 to about 90 weight percent and wherein said 50 parts alumina is admixed with from about 50 to about 70 parts water.

* * * * *